US012465486B2

(12) United States Patent
Syedain et al.

(10) Patent No.: US 12,465,486 B2
(45) Date of Patent: Nov. 11, 2025

(54) ENGINEERED VALVE AND METHOD OF MAKING

(71) Applicant: Regents of the University of Minnesota, Minneapolis, MN (US)

(72) Inventors: Zeeshan Syedain, Minneapolis, MN (US); Robert Tranquillo, Arden Hills, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 948 days.

(21) Appl. No.: 17/614,225

(22) PCT Filed: May 28, 2020

(86) PCT No.: PCT/US2020/034916
§ 371 (c)(1),
(2) Date: Nov. 24, 2021

(87) PCT Pub. No.: WO2020/243298
PCT Pub. Date: Dec. 3, 2020

(65) Prior Publication Data
US 2022/0168099 A1 Jun. 2, 2022

Related U.S. Application Data

(60) Provisional application No. 62/853,639, filed on May 28, 2019.

(51) Int. Cl.
*A61F 2/24* (2006.01)
*A61L 27/22* (2006.01)
(Continued)

(52) U.S. Cl.
CPC .......... *A61F 2/2415* (2013.01); *A61F 2/2418* (2013.01); *A61L 27/225* (2013.01);
(Continued)

(58) Field of Classification Search
CPC .. A61L 27/3633; A61L 27/52; A61L 27/3804; A61L 27/225; A61L 27/3834;
(Continued)

(56) References Cited

U.S. PATENT DOCUMENTS 5,957,971 A    9/1999  Schwartz
6,539,984 B2   4/2003  Lam
(Continued)

FOREIGN PATENT DOCUMENTS

KR    10-2015-0036747 A    4/2015
WO    WO 2002/090528 A1    11/2002
(Continued)

OTHER PUBLICATIONS

J.C. Palmaz. Balloon-Expandable Intravascular Stent. AJR (1988), 150, 1263-1269. (Year: 1988).*
(Continued)

*Primary Examiner* — Sean C. Barron
(74) *Attorney, Agent, or Firm* — Fish & Richardson P.C.

(57) ABSTRACT

This disclosure provides a tissue-engineered transcatheter vein valve and methods of making such a tissue-engineered transcatheter vein valve. Methods of making the valve include casting or molding a polymer into a tubular structure having a first end and a second end, where the first end of the tubular structure is cast or molded around a tubular support structure and where the second end of the tubular structure is cast or molded in the absence of the support structure; everting the polymer at the second end through the support structure; anchoring the second end of the tubular structure to the support structure at a first position and a second position, where the anchored first position and the anchored second position result in commissures, forming leaflets therebetween.

24 Claims, 14 Drawing Sheets

(51) Int. Cl.

| | |
|---|---|
| *A61L 27/24* | (2006.01) |
| *A61L 27/36* | (2006.01) |
| *A61L 27/38* | (2006.01) |
| *A61L 27/52* | (2006.01) |
| *B29D 23/00* | (2006.01) |
| *B29K 105/00* | (2006.01) |
| *C12M 1/12* | (2006.01) |
| *C12M 3/00* | (2006.01) |
| *C12N 5/077* | (2010.01) |

(52) U.S. Cl.
CPC ........... *A61L 27/24* (2013.01); *A61L 27/3691* (2013.01); *A61L 27/3817* (2013.01); *A61L 27/3839* (2013.01); *A61L 27/52* (2013.01); *B29D 23/00* (2013.01); *C12M 21/08* (2013.01); *C12M 23/06* (2013.01); *C12M 25/00* (2013.01); *C12N 5/0656* (2013.01); *A61F 2220/0075* (2013.01); *A61F 2240/001* (2013.01); *A61L 2430/20* (2013.01); *A61L 2430/40* (2013.01); *B29K 2089/00* (2013.01); *B29K 2105/0061* (2013.01)

(58) Field of Classification Search
CPC ...... A61L 27/24; A61L 27/50; A61L 27/3839; A61L 27/3691; A61L 27/3817; A61L 27/507; A61L 2430/40; A61L 2430/20; C12M 23/06; C12M 25/00; C12M 21/08; A61F 2/2415; A61F 2/2475; A61F 2/2418; A61F 2240/001; A61F 2220/0075; C12N 5/0656; B29D 23/00; B29K 2105/0061; B29K 2089/00
See application file for complete search history.

(56) References Cited

U.S. PATENT DOCUMENTS

| | | | |
|---|---|---|---|
| 6,562,069 B2* | 5/2003 | Cai | ........................ A61F 2/2412 |
| | | | 623/2.12 |
| 6,666,886 B1 | 12/2003 | Tranquillo et al. | |
| 8,076,137 B2 | 12/2011 | McAllister et al. | |
| 8,128,681 B2 | 3/2012 | Shoemaker et al. | |
| 8,399,243 B2 | 3/2013 | Bouten et al. | |
| 10,105,208 B2 | 10/2018 | Tranquillo et al. | |
| 10,111,740 B2 | 10/2018 | Tranquillo et al. | |
| 10,893,928 B2 | 1/2021 | Tranquillo et al. | |
| 2004/0115176 A1 | 6/2004 | Swartz et al. | |
| 2010/0228335 A1 | 9/2010 | Schorgl et al. | |
| 2014/0058496 A1 | 2/2014 | Tranquillo et al. | |
| 2014/0180399 A1 | 6/2014 | Alavi et al. | |
| 2014/0330377 A1 | 11/2014 | Niklason et al. | |
| 2015/0164631 A1 | 6/2015 | Tranquillo et al. | |
| 2019/0160204 A1 | 5/2019 | Tranquillo et al. | |
| 2023/0293769 A1 | 9/2023 | Tranquillo et al. | |

FOREIGN PATENT DOCUMENTS

| | | |
|---|---|---|
| WO | WO 2004/038004 A2 | 5/2004 |
| WO | WO 2005/011534 | 2/2005 |
| WO | WO 2007/025233 | 3/2007 |
| WO | WO 2010/028197 A1 | 3/2010 |
| WO | WO 2010/120539 | 10/2010 |
| WO | WO 2011/076186 A2 | 6/2011 |
| WO | WO 2012/111000 A1 | 8/2012 |
| WO | WO 2012/122567 | 9/2012 |
| WO | WO 2013/090878 | 6/2013 |
| WO | WO 2017/176919 | 10/2017 |
| WO | WO 2018/102826 | 6/2018 |
| WO | WO 2019/006430 | 1/2019 |

OTHER PUBLICATIONS

Robinson et al. Functional Tissue-Engineered Valves from Cell-Remodeled Fibrin with Commissural Alignment of Cell-Produced Collagen. Tissue Engineering Part A (2008), 14(1), 83-95 (Year: 2008).*

Furukoshi et al. "Development of an in vivo tissue-engineered vascular graft with designed wall thickness (biotube type C) based on a novel caged mold," J. Artif. Organs, Mar. 2016, 19(1):54-61.

International Preliminary Report on Patentability in International Application No. PCT/US2017/026204 dated Jul. 18, 2018, 9 pages.

International Search Report & Written Opinion in International Application No. PCT/US2017/026204 dated Jul. 7, 2017, 20 pages.

Kawajiri et al., "Implantation study of a tissue-engineered self-expanding aortic stent graft (bio stent graft) in a beagle model," J. Artif. Organs, Mar. 2015, 18(1):48-54.

Kheradvar et al., "Emerging Trends in Heart Valve Engineering: Part I. Solutions for Future," Ann. Biomed. Eng., Apr. 2015, 43(4):844-857.

Scarritt et al., "A review of cellularization strategies for tissue engineering of whole organs, " Front. Bioeng. Biotechnol., Mar. 2015, 3:43.

Syedain et al., "Tissue-engineered Tavi Valve With Matrix-embedded Stent," Poster: P148, Presented at the Proceedings of the Heart Valve Society 2018 Annual Scientific Meeting, Apr. 12-14, 2018, New York, New York, 2 pages.

Weber et al., "Tissue-engineered fibrin-based heart valve with a tubular leaflet design," Tissue Eng. Part C Methods, Apr. 2014, 20(4):265-275.

Weinandy et al., "The BioStent: novel concept for a viable stent structure," Tissue Eng. Part A, Sep. 2012, 18(17-18):1818-1826.

U.S. Appl. No. 18/123,157, filed Mar. 17, 2023, Robert Tranquillo, Published as U.S. Publication No. 2023/0293769.

Ahmann et al., "Shear stress responses of adult blood outgrowth endothelial cells seeded on bioartificial tissue," Tissue Eng. Part A, Jul. 1, 2011, 17(19-20):2511-2521.

Baptista et al., "Whole organ decellularization—a tool for bioscaffold fabrication and organ bioengineering," Presented at Proceedings of the IEEE 2009 Annual International Conference of the IEEE Engineering in Medicine and Biology Society, Minneapolis, MN, USA, Sep. 2-6, 2009; Annu. Int. Conf. IEEE Eng. Med. Biol. Society, 2009, 2009:6526-6529.

Brass et al., "Growth and remodeling of canine common iliac vein in response to venous reflux and hypertension," J. Vasc. Surg. Venous Lymphat. Disorders, Jul. 2015, 3(3):303-311.e1.

Crapo et al., "An overview of tissue and whole organ decellularization processes," Biomaterials, Apr. 2011, 32(12):3233-3243.

Dotter, "Interventional radiology—Review of an emerging field," Semin. Roentgenology, Jan. 1981, 16(1):7-12.

Eberhardt et al., "Chronic Venous Insufficiency," Circulation, May 10, 2005, 111(18):2398-2409.

Fronek et al., "Common femoral vein dimensions and hemodynamics including Valsalva response as a function of sex, age, and ethnicity in a population study," J. Vasc. Surgery, May 2001, 33(5):1050-1056.

Gale et al., "Percutaneous venous valve bioprosthesis: initial observations," Vasc. Endovascular Surgery, May/Jun. 2004, 38(3):221-224.

Glynn et al., "In vivo assessment of two endothelialization approaches on bioprosthetic valves for the treatment of chronic deep venous insufficiency," J. Biomed. Mater. Res. B Appl. Biomaterials, Nov. 2016, 104(8):1610-1621.

Gohel et al., "A randomized trial of early endovenous ablation in venous ulceration," N. Engl. J. Medicine, May 31, 2018, 378(22):2105-2114.

Kearon et al., "Duration of anticoagulant therapy for deep vein thrombosis and pulmonary embolism," Blood, Feb. 4, 2014, 123(12):1794-1801.

La et al., "Shear Conditioning of Adipose Stem Cells for Reduced Platelet Binding to Engineered Vascular Grafts," Tissue. Eng. Part A, Aug. 2018, 24(15-16):1242-1250.

Laing, "Chronic Venous Diseases of the Leg," Office of Health Economics, Dec. 1992, 44 pages.

(56) References Cited

OTHER PUBLICATIONS

L'Heureux et al., "Cytograft Tissue Engineering: A new paradigm in cardiovascular tissue engineering," Regen. Medicine, Jun. 27, 2008, 3(4):471-475.
Lurie et al., "Mechanism of venous valve closure and role of the valve in circulation: a new concept," J. Vasc. Surgery, Nov. 2003, 38(5):955-961.
Lurie et al., "The mechanism of venous valve closure in normal physiologic conditions," J. Vasc. Surgery, Apr. 2002, 35(4):713-717.
Maurins et al., "Distribution and prevalence of reflux in the superficial and deep venous system in the general population—results from the Bonn Vein Study, Germany," J. Vasc. Surgery, Sep. 2008, 48(3):680-687.
Meier et al., "Blood outgrowth endothelial cells alter remodeling of completely biological engineered grafts implanted into the sheep femoral artery," J. Cardiovasc. Transl. Research, Mar. 2014, 7(2):242-249.
Midha et al., "Valve Type, Size, and Deployment Location Affect Hemodynamics in an In Vitro Valve-in-Valve Model," JACC Cardiovasc. Interventions, Aug. 8, 2016, 9(15):1618-1628.
Mogaldea et al., "Tissue Engineering of Vein Valves Based on Decellularized Natural Matrices," Cells Tissues Organs, Aug. 5, 2017, 204(3-4):199-209.
Moreira et al., "Tissue-engineered heart valve with a tubular leaflet design for minimally invasive transcatheter implantation," Tissue Eng. Part C Methods, Dec. 19, 2014, 21(6):530-540.
Mouza et al., "A Simplified model for predicting friction factors of laminar blood flow in small-caliber vessels," Fluids, Oct. 19, 2018, 3(4):75-87.
Næss et al., "Incidence and mortality of venous thrombosis: A population-based study," J. Thromb. Haemostasis, Apr. 2007, 5(4):692-699.
Neidert et al., "Enhanced fibrin remodeling in vitro with TGF-b1, insulin and plasmin for improved tissue-equivalents," Biomaterials, Sep. 2002, 23(17):3717-3731.
Ott et al., "Perfusion-decellularized matrix: using nature's platform to engineer a bioartificial heart," Nat. Medicine, Feb. 2008, 14(2):213-221.
Pavcnik et al., "Percutaneous autologous venous valve transplantation: short-term feasibility study in an ovine model," J. Vasc. Surgery, Aug. 2007, 46(2):338-345.
Pavcnik et al., "Percutaneous management of chronic deep venous reflux: review of experimental work and early clinical experience with bioprosthetic valve," Vasc. Medicine, Feb. 2008, 13(1):75-84.
Pavcnik et al., "Second-generation percutaneous bioprosthetic valve: a short-term study in sheep," J. Vasc. Surgery, Dec. 2004, 40(6):1223-1227.
PCT International Preliminary Report on Patentability in International Appln. No. PCT/US2020/034916, dated Nov. 16, 2021, 6 pages.
PCT International Search Report and Written Opinion in International Appln. No. PCT/US2020/034916, dated Aug. 7, 2020, 9 pages.
Reimer et al., "Implantation of a Tissue-Engineered Tubular Heart Valve in Growing Lambs," Ann. Biomed. Engineering, Feb. 2017, 45(2):439-451.
Reimer et al., "Pediatric tubular pulmonary heart valve from decellularized engineered tissue tubes," Biomaterials, Sep. 2015, 62:88-94.
Sathe et al., "Flexible prosthetic vein valve," J. Med. Devices, Jun. 2007, 1(2):105-112.
Syedain et al., "6-month aortic valve implantation of an off-the-shelf tissue-engineered valve in sheep," Biomaterials, Dec. 2015, 73:175-184.
Syedain et al., "A completely biological "off-the-shelf" arteriovenous graft that recellularizes in baboons," Sci. Transl., Medicine, Nov. 1, 2017, 9(414):eaan4209, 11 pages.
Syedain et al., "Controlled cyclic stretch bioreactor for tissue-engineered heart valves," Biomaterials, Sep. 2009, 30(25):4078-4084.
Syedain et al., "Implantable arterial grafts from human fibroblasts and fibrin using a multi-graft pulsed flow-stretch bioreactor with noninvasive strength monitoring," Biomaterials, Jan. 2011, 32(3):714-722.
Syedain et al., "Implantation of completely biological engineered grafts following decellularization into the sheep femoral artery," Tissue Eng. Part A, Jun. 2014, 20(11-12):1726-1734.
Syedain et al., "Tissue engineering of acellular vascular grafts capable of somatic growth in young lambs," Nat. Communications, Sep. 27, 2016, 7:12951, 10 pages.
Syedain et al., "Tissue-engineered Transcatheter Vein Valve," Biomaterials, Sep. 2019, 216:119229, 9 pages.
Syedain et al., "Tubular heart valves from decellularized engineered tissue," Ann. Biomed. Engineering, Dec. 2013, 41(12):2645-2654.
Tanner, "Design, analysis, testing, and evaluation of a prosthetic venous valve," Thesis for the degree of Master of Science, Georgia Institute of Technology, School of Mechanical Engineering, May 2013, 179 pages.
Tien et al., "Role of sinus in prosthetic venous valve," Eur. J. Vasc. Endovasc. Surgery, Jul. 2014, 48(1):98-104.
Tripathi et al., "Five-Year Experience of Valvular Reconstructions for Nonhealing Leg Ulceration due to Deep Venous Reflux: Lessons Learned," Perspect. Vasc. Surg. Endovasc. Therapy, Mar. 1, 2002, 15(2):87-100.
Ulloa et al., "Human trial using the novel bioprosthetic VenoValve in patients with chronic venous insufficiency," J. Vasc. Surg. Venous Lymphat. Disorders, Nov. 19, 2020, 9(4):938-944.
van Langevelde et al., "The effect of aging on venous valves," Arterioscler. Thromb. Vasc. Biology, Jul. 29, 2010, 30(10):2075-2080.
Volkmann et al., "Effect of varicose vein surgery on venous reflux scoring and plethysmographic assessment of venous function," Eur. J. Vasc. Endovasc. Surgery, Dec. 2008, 36(6):731-737.
Vuylsteke et al., "An Epidemiological Survey of Venous Disease Among General Practitioner Attendees in Different Geographical Regions on the Globe: The Final Results of the Vein Consult Program," Angiology, Oct. 2018, 69(9):779-785.
Weber et al., "Living-engineered valves for transcatheter venous valve repair," Tissue Eng. Part C Methods, Jun. 2014, 20(6):451-463.
Wystrychowski et al., "Case study: first implantation of a frozen, devitalized tissue-engineered vascular graft for urgent hemodialysis access," J. Vasc. Access, Jan.-Mar. 2011, 12(1):67-70.
Yuan et al., "Functional analysis in vivo of engineered valved venous conduit with decellularized matrix and two bone marrow-derived progenitors in sheep," J. Tissue Eng. Regen. Medicine, Jul. 2016, 10(7):554-563.
Zervides et al., "The role of venous valves in pressure shielding," Biomed. Eng. Online, Feb. 15, 2008, 7:8, 10 pages.
Zhang et al. "Application of Hydrogels in Heart Valve Tissue Engineering," J. Long Term Eff. Med. Implants, May 2015, 25(1-2):105-134.
Syedain et al., "Pediatric tri-tube valved conduits made from fibroblast-produced extracellular matrix evaluated over 52 weeks in growing lambs," Sci. Transl. Med., Mar. 2021, 13(585):eabb7225.
EP Extended Search Report in European Appln. No. 20814544.1, dated Jul. 1, 2022, 8 pages.

\* cited by examiner

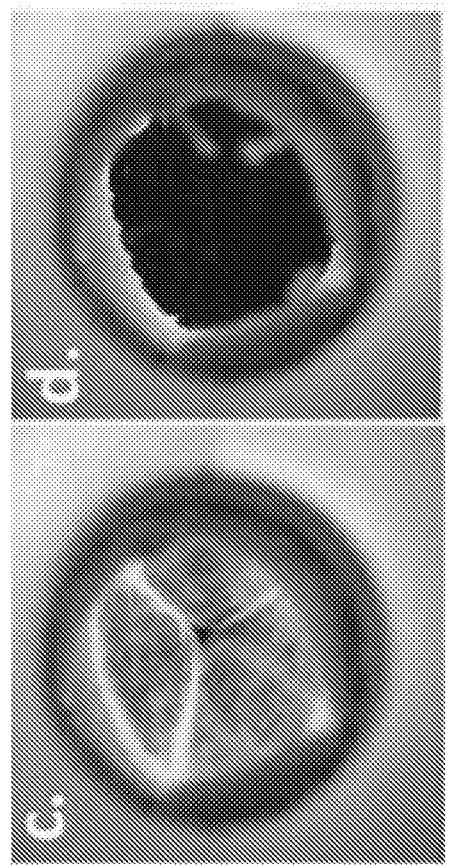
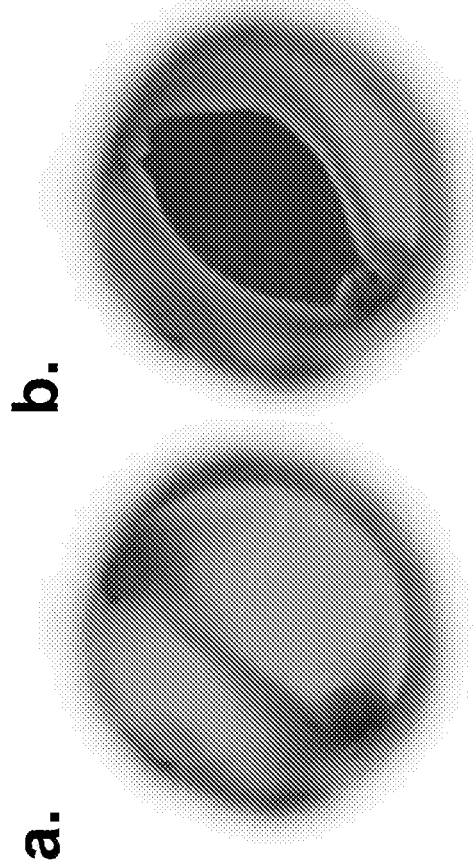
FIG. 3a - 3d

ENGINEERED VALVE AND METHOD OF MAKING

CROSS-REFERENCE TO RELATED APPLICATIONS

This application is a National Stage application under 35 U.S.C. § 371 of International Application No. PCT/US2020/034916 having an International Filing Date of May 28, 2020, which claims the benefit of priority under 35 U.S.C. § 119(e) to U.S. Application No. 62/853,639, filed on May 28, 2019.

TECHNICAL FIELD

This disclosure generally relates to tissue engineering.

BACKGROUND

Loss of vein valve leaflet coaptation during valve closure from reverse pressure gradients (e.g., when standing) and the resultant reflux of blood (i.e., regurgitation back through the incompetent valve) is a major cause of chronic venous insufficiency (CVI) along with calf pump dysfunction and outflow obstruction/resistance. CVI of valves in deep veins, such as the femoral and popliteal veins, often can be effectively treated with compression stockings, but this is arduous for the average patient. Beyond the cosmetic consequences that can reduce quality of life, venous ulcers are a direct, serious consequence of CVI, with as much as 20% of those afflicted with CVI developing ulcers. Venous ulcers have a poor prognosis, with delayed healing (50% requiring >1 year) and common recurrent ulceration.

Estimating the patient population that would benefit from a successful prosthetic vein valve is speculative, but even a conservative estimate suggests that a substantial number of patients with venous ulcers, particularly debilitating venous ulcers, could benefit if one were available.

SUMMARY

This disclosure describes a novel valve based on a biologically engineered matrix that exhibits endothelialization potential, contains an embedded Nitinol stent, and forms leaflets. The tissue-engineered valve described herein exhibits low open valve pressure drop, small closing volume, and one million cycle durability post-crimping.

In one aspect, methods of making an engineered valve are provided. Such methods typically include casting or molding a polymer into a tubular structure having a first end and a second end, where the first end of the tubular structure is cast or molded around a tubular support structure and where the second end of the tubular structure is cast or molded in the absence of the support structure; everting the polymer at the second end through the support structure; anchoring the second end of the tubular structure to the support structure at a first position and a second position, where the anchored first position and the anchored second position result in commissures, forming leaflets therebetween; thereby producing an engineered valve.

Representative polymers include, without limitation, agarose, methylcellulose, hyaluronan, collagen, fibrin, fibrinogen, and combinations thereof. In some embodiments, the polymer is a hydrogel. Representative hydrogels include fibrin and collagen.

In some embodiments, the hydrogel comprises matrix-producing cells. Representative matrix-producing cells are fibroblasts.

In some embodiments, the method further comprises culturing the tubular structure comprising the support structure under conditions in which the hydrogel comprising the matrix-producing cells is remodeled into a tubular extracellular matrix comprising the support structure at the first end. In some embodiments, the method further comprises culturing the tubular structure under conditions in which the tubular extracellular matrix comprises circumferentially aligned fibers.

In some embodiments, the support structure is a stent or a wireform. Representative stents are self-expanding stents and balloon-expanding stents. In some embodiments, the second end of the tubular structure is cast or molded using a mandrel, a mold, or combinations thereof.

In some embodiments, the anchoring step comprises stitching, suturing, stapling, gluing, or combinations thereof. In some embodiments, such methods further include anchoring the second end of the tubular structure to the support structure at a third position.

In some embodiments, an average inner diameter of the tubular structure is about 5 mm to about 20 mm. In some embodiments, an average inner diameter of the tubular structure is about 12 mm to about 16 mm. In some embodiments, an average inner diameter of the tubular structure is about 14 mm.

In some embodiments, a commissure-to-commissure length, when flat, is about 100% to 125% of an inner diameter of the tubular structure. In some embodiments, a commissure-to-commissure length, when flat, is about 110% to 120% of an inner diameter of the tubular structure. In some embodiments, a commissure-to-commissure length, when flat, is about 115% of an inner diameter of the tubular structure.

In some embodiments, such methods further include decellularizing the tubular extracellular matrix comprising the support structure. In some embodiments, such methods further include recellularizing the tubular extracellular matrix comprising the support structure.

A valve made by any of the methods described herein. Generally, such a valve can withstand a back pressure of greater than 300 mmHg (e.g., greater than 600 mmHg). Representative valves are vein valves and heart valves.

In another aspect, methods of making a tissue-engineered valve are provided. Such methods typically include casting or molding a hydrogel comprising matrix-producing cells into a tubular structure having a first end and a second end, wherein the first end of the tubular structure is cast or molded around a stent, wherein the second end of the tubular structure is cast or molded in the absence of the stent; culturing the tubular structure comprising the stent under conditions in which the hydrogel comprising the matrix-producing cells is remodeled into a tubular extracellular matrix comprising the stent at the first end; decellularizing the tubular extracellular matrix comprising the stent at the first end; everting the second end of the tubular extracellular matrix through the stent; and anchoring the second end of the tubular extracellular matrix to the stent at a first position and a second position, wherein the anchored first position and anchored second position result in commissures, forming leaflets therebetween; thereby producing a tissue-engineered valve.

In one aspect, methods of making a tissue-engineered valve are provided. Such methods typically include generating a tubular structure that includes an embedded support structure at a first end, where the tubular structure including an embedded support structure is generated by casting or molding a hydrogel comprising matrix-producing cells around the support structure; culturing the tubular structure comprising the support structure under conditions in which the hydrogel including the matrix-producing cells is remodeled into a tubular extracellular matrix including the support structure at a first end; everting the tubular extracellular matrix through the support structure, where the anchoring positions result in commissures, forming leaflets therebetween; and anchoring at least a first and a second position at a second end of the tubular extracellular matrix to the support structure; thereby producing a valve.

In some embodiments, the hydrogel includes fibrin. In some embodiments, the hydrogel includes collagen. In some embodiments, the matrix-producing cells are fibroblasts (e.g., dermal fibroblasts).

In some embodiments, generating a tubular structure (e.g., in a portion that does not include a support structure) includes using a mandrel, a mold, or combinations thereof. In some embodiments, the stent is a self-expanding stent (e.g., made from Nitinol) or a balloon expandable stent (e.g., made from stainless steel). In some embodiments, the culturing is under conditions in which circumferential alignment of the fibers at a second end of the tubular extracellular matrix is achieved. In some embodiments, the anchoring step includes stitching, suturing, stapling, gluing, or combinations thereof.

In some embodiments, the number of positions anchored dictates the number of leaflets in the valve. In some embodiments, a first and second anchoring position produces a bi-leaflet valve. In some embodiments, the anchoring step includes a third position to produce a tri-leaflet valve.

In some embodiments, an inner diameter of the tubular structure is about 5 mm to about 20 mm. In some embodiments, an inner diameter of the tubular structure is about 12 mm to about 16 mm. In some embodiments, an inner diameter of the tubular structure is about 14 mm.

In some embodiments, a commissure-to-commissure length, when flat, is about 100% to 125% of an inner diameter of the tubular structure. In some embodiments, a commissure-to-commissure length, when flat, is about 110% to 120% of an inner diameter of the tubular structure. In some embodiments, a commissure-to-commissure length, when flat, is about 115% of an inner diameter of the tubular structure.

In some embodiments, the method further comprising decellularizing the tubular extracellular matrix comprising the embedded support structure. In some embodiments, the method further comprising recellularizing the valve.

In another aspect, valves made by any of the method described herein is provided. Such valves generally can withstand a back pressure of greater than 300 mmHg, and oftentimes, greater than 600 mmHg. In some embodiments, the valve is a vein valve. In some embodiments, the valve is a heart valve.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

FIG. 1c); and the stitched end of the tubular end was everted into the stent to create a bileaflet design (FIG. 1d). Trichrome staining showed aligned collagen fibers in the formed leaflets (100 µm scale bar; FIG. 1e), and picrosirius red staining showed aligned collagen fibers in the formed leaflets (100 µm scale bar; FIG. 1f).

FIG. 2b) and the regurgitation fraction/volume of valves made using three different leaflet lengths under cyclic flow at 70 cpm (paired symbols show difference $P<0.05$; FIG. 2c).

FIG. 3a-3d are photographs showing an end-on view of a tissue-engineered valve made as described herein in the pulse duplicator fully closed (FIG. 3a) and fully open (FIG. 3b) or an end-on view of an ovine jugular vein valve in the pulse duplicator fully closed (FIG. 3c) and fully open (FIG. 3d).

DETAILED DESCRIPTION

Figures 1A, 1B:
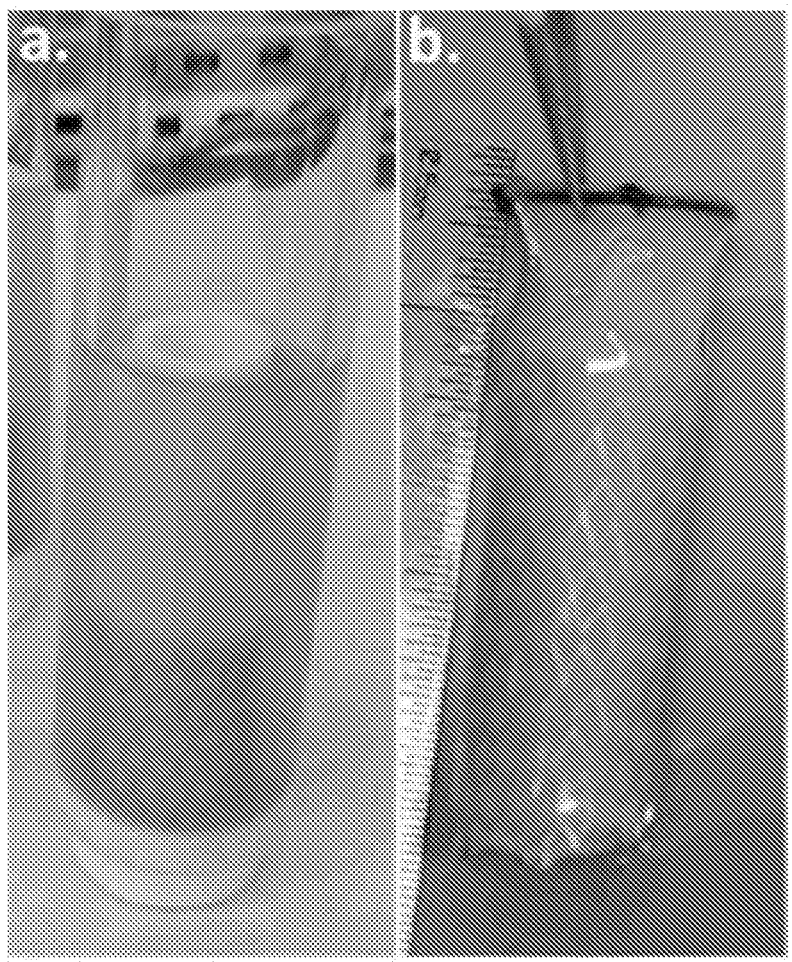
FIG. 1a-1f shows an exemplary method of fabricating a tissue-engineered valve. For example, the fibrin gel was injected into a mold that includes a 12 mm stent (FIG. 1a); the fibrin gel was remodeled into engineered tissue (FIG. 1b); the tubular end of the engineered tissue was stitched (purple.

The methods and compositions described herein can be used to make any number of representative valves including, without limitation, mitral valves, aortic valves, tricuspid valves, pulmonary heart valves, and vein valves. Unlike a wide variety of mechanical and bioprosthetic heart valves routinely implanted into adult patients (now also delivered via catheter in the case of bioprosthetic valves), however, there is not a single prosthetic vein valve clinically available. While a vein valve has the same basic one-way valve function of a heart valve, some key requirements for a prosthetic vein valve are distinct. In contrast to a bioprosthetic heart valve, a prosthetic vein valve must be non-thrombogenic to avoid the morbidities of indefinite anticoagulation therapy, otherwise required due to the much lower blood flow rate in the leg, and it almost certainly must be delivered via a catheter because of the more fragile nature of veins. Clinical studies of an implanted prosthetic vein valve have highlighted the potential benefit of a venous valve; however, the material used for making the leaflets has, to date, lacked stability and hemocompatibility. The present disclosure provides compositions and methods for overcoming such limitations.

Methods of making a novel tissue-engineered valve are described that include growing and remodeling a hydrogel directly on a support structure. Hydrogels and methods of making hydrogels are known in the art. Hydrogels, or hydrogel solutions, generally refer to aqueous solutions containing hydrophilic natural (e.g., biological) or synthetic (e.g., non-biological) polymeric chains. See, for example, U.S. Pat. No. 6,666,886 and U.S. Publication No. 2014/0058496. Representative hydrogels include, for example, agarose, methylcellulose, hyaluronan, collagen, fibrinogen, and combinations thereof. The amount of hydrogel used in a composition described herein can range from about 1% to about 80% (e.g., about 2% to about 75%, about 5% to about 75%, 20% to about 70%, about 30% to about 60%, about 40% to about 50%, or about 50%). The presence of and the actual amount of one or more hydrogels will depend upon the desired features of the subsequently produced tissue-engineered valve (e.g., softness or hardness, flexibility, absorbency). The resulting hydrogel then can be molded (or cast, shaped, deposited, formed, or printed) to appropriately encompass the support structure.

In some embodiments, methods of culturing and remodeling a hydrogel to produce an engineered tissue can include, for example, the use of matrix-producing cells. Matrix-producing cells are those cells that are able to convert a hydrogel into an extracellular matrix material or extracellular matrix-like material. Matrix-producing cells include, without limitation, fibroblasts (e.g., dermal fibroblasts), smooth muscle cells, and interstitial cells. Matrix-producing cells can be a single cell type (e.g., fibroblasts or smooth muscle cells or interstitial cells) or the cells used to seed a hydrogel can be a multitude of cell types (e.g., fibroblasts and smooth muscle cells, or fibroblasts and interstitial cells, or smooth muscle cells and interstitial cells). Further, the cells can be from any number of organisms (e.g., human, primate, rodent) and/or any number of tissues (e.g., dermis, lung, connective tissue, kidney). It would be appreciated that the cells can be added to the hydrogel prior to the gel being appropriately shaped or after the gel has been appropriately shaped on, in, around and/or within the structural component. The step of culturing refers to conditions that are suitable for the matrix-producing cells to convert, or remodel, the hydrogel into extracellular matrix material or extracellular matrix-like material. Under appropriate culture conditions, the hydrogel is remodeled into an extracellular matrix by the cells, while maintaining the original shape. Based on the manner in which the engineered tissue is produced, the resulting engineered tissue, when examined in a cross-section, is uniform and lacks any layers.

During remodeling of the hydrogel into an extracellular matrix and, ultimately, the engineered tissue, the hydrogel and/or the extracellular matrix can be mechanically manipulated, or "conditioned". Conditioning can include, without limitation, mechanical manipulation (e.g., static culture, circumferential stretching, longitudinal stretching, inflation/distention), electrical stimulation (e.g., field stimulation, AC or DC current), and/or biological manipulation with molecules/compounds such as growth factors and cytokines. Manipulation or conditioning of the hydrogel and/or the extracellular matrix can be cyclic or periodic.

Remodeling of the hydrogel into the extracellular matrix material or extracellular matrix-like material results in circumferentially-aligned fibers within the matrix. A tissue-engineered valve produced as described herein exhibits the non-linear stress-strain curve typical of native tissue and possesses physiological compliance and a burst pressure that meets or exceeds that of native arteries. The resulting tensile mechanical properties and collagen content compare well to native cardiovascular tissue.

Once remodeling is complete or near complete, the engineered tissue can be decellularized (e.g., to remove the matrix-forming cells), if so desired. Decellularizing as used herein refers to the removal of any remaining cells or cellular materials from the extracellular matrix material or extracellular matrix-like material. Decellularization is known in the art and can be performed using a number of different methods. See, for example, WO 2007/025233, WO 2010/120539, Ott et al. (2008, *Nat. Med.*, 14:213-21), Baptista et al. (2009, *Conf. Proc. IEEE Eng. Med. Biol. Soc.*, 2009:6526-9) or Crapo et al. (2011, *Biomaterials*, 32:3233-43). Alternatively or additionally, the engineered tissue can be devitalized (i.e., killed without removal). See, for example, L'Heureux & McAllister, 2008, Regenerative Med., 3(4):471-5 and Wystrychowski et al., 2011, J. Vasc. Access., 12(1):67-70.

A support structure can be virtually any type of material (e.g., a shape-memory alloy like nitinol, stainless steel, a polymer, or a suitably porous material) and any shape (e.g., circular, oval). A representative support structure can be a stent (e.g., an expandable stent) or a wireform (see, e.g., U.S. Pat. No. 6,539,984). Virtually any type of stent (e.g., an expandable stent) can be used (e.g., a self-expanding stent (e.g., made from Nitinol) or a balloon-expanding stent (e.g., made from stainless steel), and a support structure suitable for use herein can have a uniform circular diameter or a noncircular diameter (e.g., elliptical or oval) and/or a non-uniform diameter.

This configuration removes the traditional need for the tedious stitching of the leaflets to the support structure. The matured tissue then can be decellularized to remove immunogenic cellular antigens and, thus, becomes a potentially "off-the-shelf" implantable device composed of an acellular, cell-produced collagenous matrix.

Alternatively or additionally, the engineered tissue (e.g., decellularized or devitalized engineered tissue) can be chemically or physically modified. Chemical modifications to engineered tissue include, for example, matrix crosslinking by chemical agents (e.g., glutaraldehyde) or enzymes (e.g., transglutaminase), or conjugation of proteins (e.g., heparin) or peptides by enzymes or via high affinity domains of fusion proteins. Physical modifications (e.g. for matrix crosslinking) include, without limitation, dehydration, heating, and/or UV irradiation.

The valve then can rely upon intrinsic host processes to become reanimated (recellularized) and remodeled into the target functional tissue post-implantation, or a tissue-engineered valve can be pre-seeded with endothelial cells (e.g., autologous endothelial cells) or another type of progenitor cells. Engineered tissue (e.g., decellularized or devitalized engineered tissue) can be recellularized with one or more desired cell types. The type(s) of cells used for recellularization will depend on its intended use. Cells used in the recellularization process can be stem cells (e.g., embryonic stem cells (ESCs), induced pluripotent stem cells (iPSCs), mesenchymal stem cells (MSCs), or adult-derived stem cells), or cells used in the recellularization process can be non-stem cells (e.g., one or more types of cells at some stage of differentiation). Simply by way of example, non-stem cells include, without limitation, endothelial cells, epithelial cells, fibroblasts, smooth muscle cells, and/or any tissue- or organ-specific cells (e.g., liver, heart, lung, bone, kidney, and pancreas). In some instances, engineered tissues (e.g., decellularized engineered tissues) can be implanted and recellularized naturally in vivo.

The valves described herein can be vein valves or heart valves. Unlike heart valves, there are no established performance standards for vein valves. Standards have been proposed based on analysis of the literature (Tanner, 2013, "Design, analysis testing, and evaluation of a prosthetic venous valve," School of Mechanical Engineering, Georgia Institute of Technology) and comparative standards for heart valves: (i) less than 0.5 sec closing time; (ii) less than 5 mm Hg·min/L outflow resistance ($=\Delta P/Q$ under steady forward flow conditions), (iii) washout at 400 mL/min steady flow (where washout is defined as no apparent stagnation points based on dye disposition following a bolus injection near the valve) and (iv) selected heart valve standards, such as <10% regurgitant volume during pulse duplicator testing (taken from ISO 5840).

Two leaflets of the valve are formed by stitching opposite sides of the tubular matrix that extends from a first end of the support structure, everting the tubular matrix into the support structure, and stitching the everted tubular matrix to the support structure at each commissures and the midway points along the previously stitched sides. Thus, the leaflets are formed from the extracellular matrix or extracellular matrix-like material, which is contiguous with the extracellular matrix or extracellular matrix-like material covering the support structure. In other words, there is no need to suture separate or individual leaflets to the support structure. The novel design of the tissue-engineered valve described herein creates a completely matrix-covered support structure without any need for stitching or suturing the leaflets to the support structure.

The tissue-engineered valves described herein can be designed to have desired free edge lengths, corresponding to increased coaptation area as well as leaflet area. Such lengths can be measured as the flat commissure-to-commissure length relative to the inner diameter of the valve. To generate a tissue-engineered valve having a flat commissure-to-commissure length to inner diameter of greater than 100%, a mandrel and a tube diameter can be used that is commensurately greater than the stent diameter (e.g., 105%, 115%, or 125%). In some instances, the portion of the tubular structure that does not include the support structure has a larger diameter than the diameter of the portion of the tubular structure that includes the support structure. For example, the diameter of the portion of the tubular structure that does not include the support structure can have a larger diameter throughout its length than the portion of the tubular structure that includes the support structure, or the diameter of the portion of the tubular structure that does not include the support structure can taper down gradually to the diameter of the portion of the tubular structure that includes the support structure.

The size and shape of an engineered tissue as described herein will depend entirely on its intended use and/or the intended use of the structural component. Given the fabrication steps of solid structure embedding, tube sewing and eversion to create the tissue-engineered valve, no size limitation is envisioned. For example, the methods described herein can be used to product small (e.g., vein; e.g., 8-14 mm) to large (e.g., heart; e.g., 16-28 mm) diameter tissue-engineered valves of clinical relevance.

In accordance with the present invention, there may be employed conventional molecular biology, microbiology, biochemical, and recombinant DNA techniques within the skill of the art. Such techniques are explained fully in the literature. The invention will be further described in the following examples, which do not limit the scope of the methods and compositions of matter described in the claims.

EXAMPLES

Example 1—Valve Fabrication

Figures 1C, 1D, 1E, 1F:
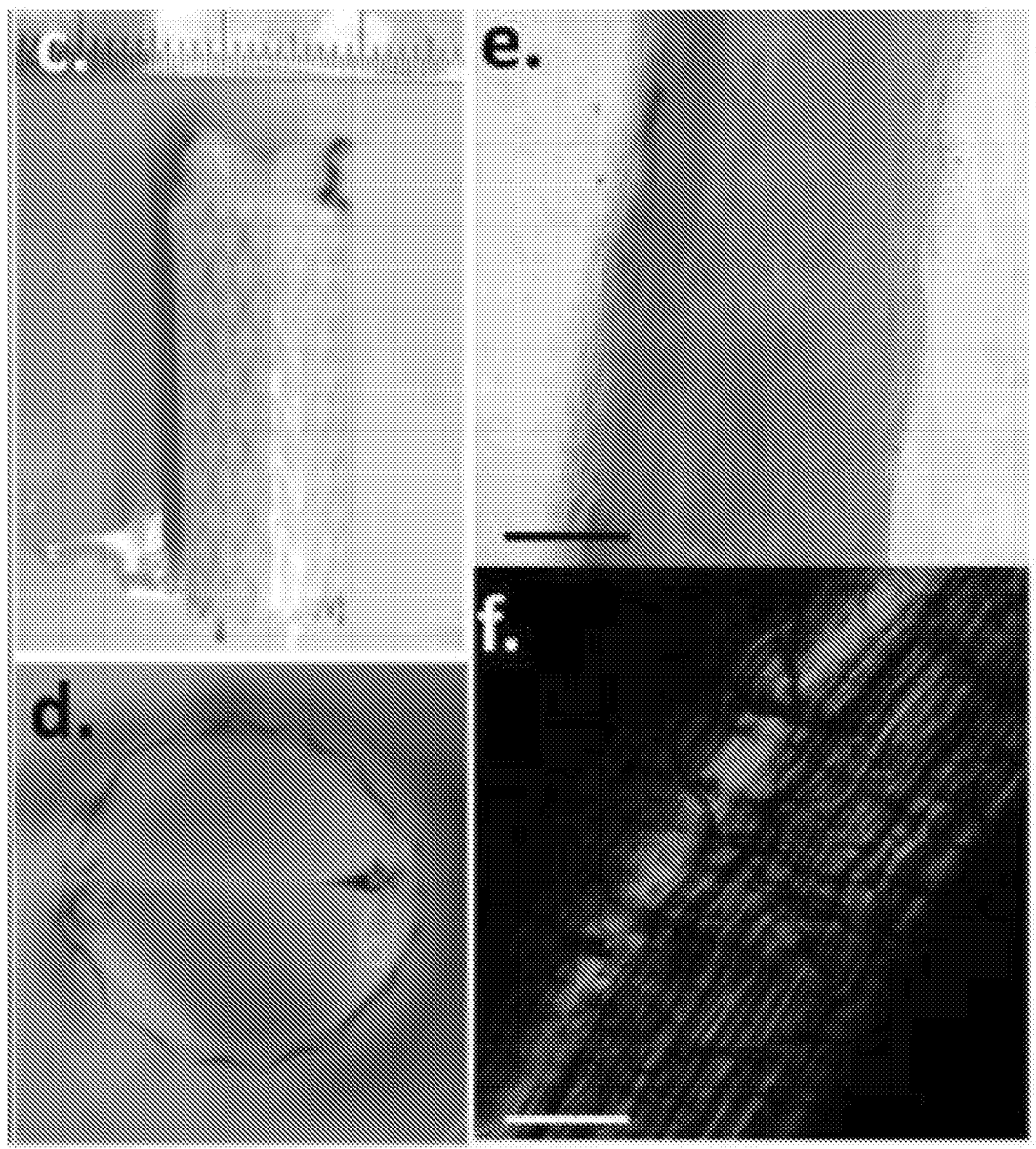

A fibrin gel with entrapped fibroblasts was formed by mixing bovine fibrinogen (Sigma), ovine dermal fibroblasts (Coriell), thrombin (Sigma), and calcium chloride. Final component concentrations of the mixture were as follows: 4 mg/mL fibrinogen, 1 million cells/mL ovine dermal fibroblasts, 0.38 U/mL thrombin, and 5 mM CaCl2. This mixture was injected into a tubular mold with a Nitinol stent (Medtronic Protégé GPS) with a lumen diameter of 12 mm and height of 30 mm placed in the lower half of the mold (FIG. 1a). Following fibrin gelation, the outer mold casing was removed and the sample was cultured in DMEM supplemented with 10% fetal bovine serum (FBS, HyClone), 100 U/mL penicillin, 100 µg/mL streptomycin, 0.25 µg/mL amphotericin B, 2 µg/mL insulin, and 50 µg/mL ascorbic acid. After 5 weeks, during which the cells contract the gel around the stent and the protruding mandrel, and also remodel the fibrin into a collagenous matrix (FIG. 1b), the tissue-engineered valve was decellularized as described below. Two leaflets were formed by stitching opposite sides of the tube of the matrix that extended from one end of the stent (purple lines in FIG. 1c) and then everting the tube into the stent, stitching each side to the stent at the commissure and at a point midway along the tube to yield a bi-leaflet valve (FIG. 1d).

Example 2—Valve Decellularization

Tissue engineered valves were treated with 1% sodium dodecyl sulfate (SDS, Sigma) in distilled water for 6 hours (replaced after 1, 2, and 4 hours) at room temperature with continuous shaking. Decellularized tissue-engineered valves then underwent 3×10 min washes in 1% Triton X-100 (Sigma) in distilled water at room temperature. The tissue tubes were extensively rinsed in phosphate buffered saline (PBS) for one week at 4° C. before and after overnight incubation in 2 U/mL deoxyribonuclease (Worthington Biochemical) in DMEM supplemented with 10% FBS.

Example 3—Mock Valve Design

Figures 2A, 2B, 2C:
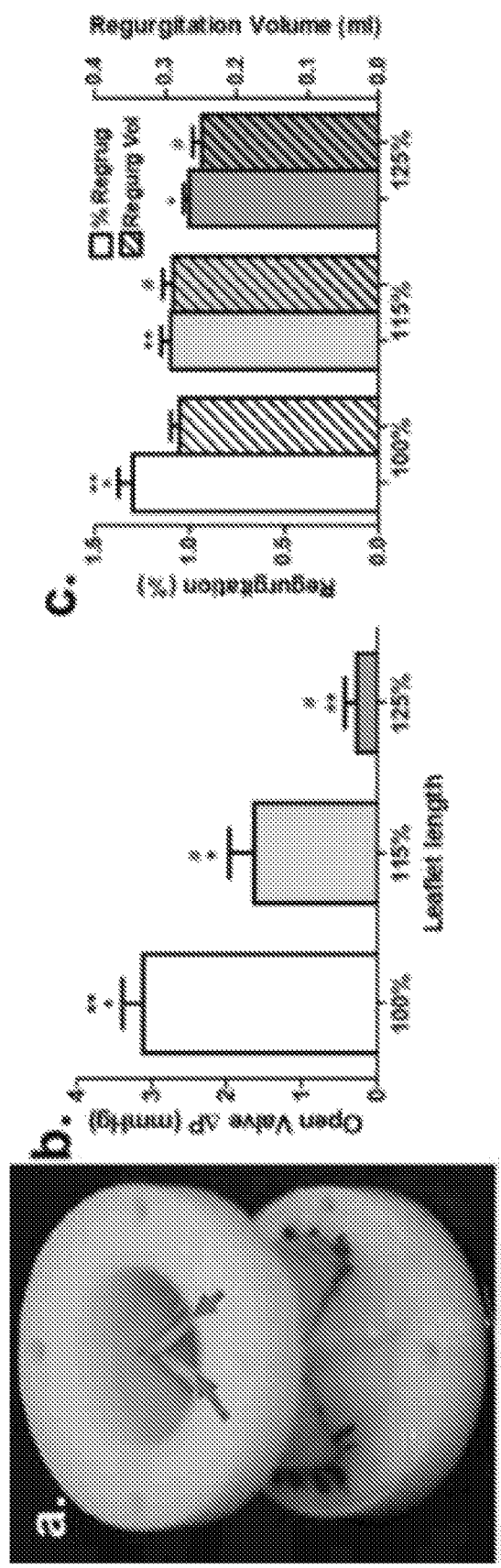
FIG. 2a is an image of the mock valve frame used to anchor two points of the engineered matrix (red arrows) to create a bi-leaflet valve with variable leaflet free edge length.
FIG. 2b-2c are graphs showing the pressure drop of valves made using three different leaflet lengths under cyclic flow at 70 cpm (paired symbols show difference $P<0.05$.
Figure 7:
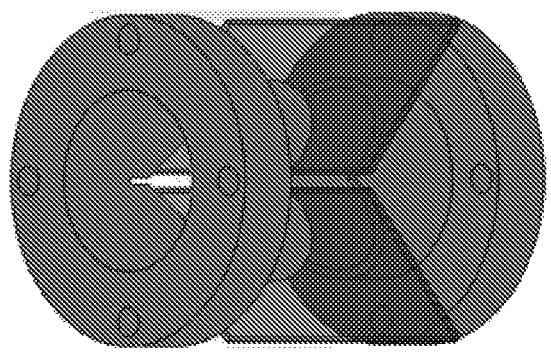
FIG. 7 is a schematic of a mock vein valve assembly with upper and lower mounts that press two sheets of engineered tissue together at a prescribed angle to form a bileaflet valve in the lumen of the assembly. Light coloration indicates regions of sheets that extend outward behind the assembly.

Based on evaluation of cadaveric vein valves (UMN Bequest Program) and previous experience with engineering bi-leaflet heart valves (Syedain & Tranquillo, 2009, Biomaterials, 30(25):4078-84), preliminary tests were performed by mounting sections of biologically-engineered tubes fabricated as described above (but without an embedded stent) into a custom 3D printed fixture with an inner diameter of 14 mm (FIG. 2a, FIG. 7). Flat commissure-to-commissure length was varied from 100% (14 mm) to 125% (17.5 mm) of the inner valve diameter to evaluate effects of excess leaflet length on the valve performance and hemodynamics.

Example 4—Hydrodynamic and Fatigue Testing

Mock tissue-engineered valves (n=3), tissue-engineered valves (n=3), and a cadaveric ovine jugular vein valve (n=1) were tested in a custom pulse duplicator system previously detailed (Syedain et al., 2013, Ann. Biomed. Eng., 41(12): 2645-54). A segment of the ovine jugular vein containing the valve was sutured onto a 14 mm stent for mounting in the system. The pulse duplicator system consists of a pulse generator (Vivitro System), compliance chambers, and a flow loop. The pulse generator pumps phosphate buffered saline (PBS) through an electromagnetic flowmeter (Carolina Medical) and the valve being tested before returning to the reservoir. Uni-directional flow was ensured by placing a bi-leaflet, mechanical valve downstream of the reservoir. For these tests, stroke volume was prescribed, leading to an average flow rate of 1.2 to 2.3 L/min. Pressure transducers (ViVitro Systems) recorded system pressures downstream and upstream of the valve tested. Instantaneous flow rates were measured using an electromagnetic flowmeter (Carolina Medical) placed between the pulse generator and test valve. Flow rates and system pressures were recorded using a custom LabVIEW program and analyzed with a custom MATLAB script. The pressure drop during the open phase of the valve cycle, closing volume, and percent regurgitation were calculated. Tissue-engineered valves were evaluated for hydrodynamic performance before and after crimping to 50% of the original diameter and then again after 1M cycles.

Example 5—Wash-Out Testing

Figure 8:
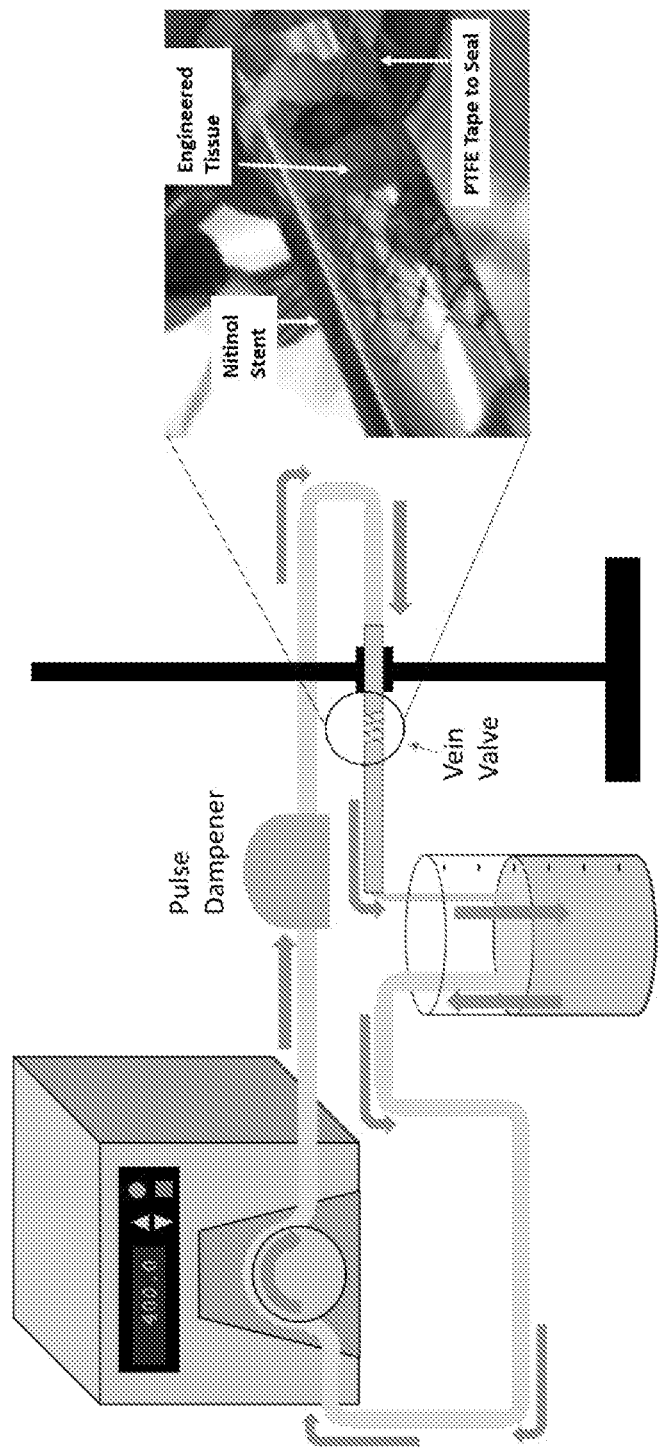
FIG. 8 is a schematic of the dye wash-out testing setup.

Engineered matrix used to make the mock valve was sewn directly to the 12 mm stent so as to emulate the bi-leaflet tissue-engineered valve geometry (the matrix embedded stent of the tissue-engineered valve would preclude dye visualization so a tissue-engineered valve could not be used for this test). The valves were mounted in a transparent plastic tube placed into a constant flow system using a peristaltic pump and pulse dampener to achieve nearly constant flow (FIG. 8). A dye solution was made by mixing crushed Crayola Bath Drops™ with approximately 0.5 mL of water, and 0.2 mL of dye solution was manually injected at an approximately constant rate over ~1 sec (12 mL/min) near the belly of the leaflets just downstream of the valve. The flow condition used for this test was 400 mL/min. Video frames were used to evaluate dye washout from behind the leaflets during injection.

Example 6—Backpressure Failure Testing

After 1M cycle fatigue testing, tissue-engineered valves were mounted in a system designed for pressurizing the leaflets and the outflow side of the tissue-engineered valve in the closed phase until failure. The tissue-engineered valve was mounted on a custom port at one end with the other end connected to a 50 cc syringe and a parallel pressure transducer (Omega). PBS was injected into the outflow end of the tissue-engineered valve at a constant rate of 10 mL/sec. Using a custom LabView program, pressure was recorded during injection, and peak pressure was defined as the failure pressure of the tissue-engineered valve.

Example 7—Tissue and Matrix Mechanical Testing

Circumferential strips (~2 mm×~10 mm) were cut from the leaflet portion of the tissue-engineered valve after the 1M cycle fatigue test. Additionally, ovine jugular vein valve leaflets and tissue slabs from 24 mm diameter engineered matrix tubes were cut into circumferential strips. Sample dimensions were measured prior to testing using a digital caliper. The strips were mounted in custom grips attached to the actuator arms of an Instron tensile testing system and straightened with a 0.02 N tensile load. Strain was calculated as the natural logarithm of the sample's deformed length over its initial length (true strain). Stress was calculated as the force divided by the undeformed, cross-sectional area of the strip (engineering stress). Maximum tension was calculated as maximum force per unit width of the strip. Membrane stiffness was defined as the slope of the strip's stress-strain curve in the linear region (i.e., tangent modulus) multiplied by the strip thickness.

Example 8—Valve Delivery in a Sheep Model

The tissue-engineered valve was crimped and delivered via catheter to the iliac vein of two adult sheep. The study protocol was approved by the Institutional Animal Care and Use Committee (IACUC) and performed at the Advanced Preclinical Imaging Center (APIC) at the University of Minnesota. Animals were housed and cared for during the duration of the study by Research Animal Resources. The first animal (#1) was a 61 kg female and second animal (#2) was a 80 kg male. For the procedure, animals were anesthetized with ketamine (0.015 mg/kg) and dexmedetomidine (1 mg/kg), then intubated and maintained on 1.5-2.5% isoflurane. Animals were also given buprenorphine (0.1-0.3 mg/kg) and carprofen (2-3 mg/kg) for pain and ceftriaxone (1 g) for antibiotic. Introducer sheaths were placed in the right external jugular vein (8F) and the right femoral vein (18F). A pigtail catheter was inserted through the femoral vein for contrast injection. Imaging with contrast dye was performed to measure the iliac and femoral vein diameters, and a location was marked for inserting a 12 mm tissue-engineered valve. The tissue-engineered valve was crimped, inserted into the delivery catheter, and deployed under C-arm scan. After deployment of the tissue-engineered valve, contrast dye was injected into the vein upstream and/or downstream of the valve to image blood flow and valve function. A cut down to the vein was performed to close the insertion site with 7-0 prolene, and the site was repaired moving outward to the skin with 5-0 prolene. The skin incision sites in the leg and neck were closed using 3-0 prolene suture. Post-surgery, animals were given carprofen (2-3 mg/kg) for pain management for 3 days, and enoxaparin (1 mg/kg BID) for 4 weeks for anti-coagulation. For the remaining 4 weeks of implantation, no anti-coagulant therapy was given. Animal #1 was imaged at 8 weeks post-implantation, just prior to sacrifice. Animal #2 was imaged at 2 weeks and at 8 weeks post-implantation, just prior to sacrifice. Harvested tissue-engineered valve were photographed and fixed for histology.

Example 9—Histology

Engineered matrix from the leaflet region and stent region of the tissue-engineered valve and from sections used to make the mock vein valve were fixed in 4% paraformaldehyde, frozen, and sectioned into 9 μm sections. Trichrome staining, picrosirius red staining, and imaging were performed as described previously (Syedain et al., 2017, Sci. Translat., Med., 9:414). Explanted tissue-engineered valve were fixed in 4% paraformaldehyde and then the remodeled matrix was dissected and peeled from the stent for cryosectioning. Sections were stained for trichrome and immunostained for von Willebrand factor (vWF) as previously described (Syedain et al., 2016, Nat. Commun., 7:12951).

Example 10—Statistics

Hydrodynamic properties (open valve ΔP, closing volume, and regurgitation) for the mock vein valve, and for the tissue-engineered valve at time zero, after crimping, and after 1M cycles, were evaluated for statistical differences using one-way ANOVA with post-hoc Tukey Test in the GraphPad Prism Software. Additionally, the maximum tension/UTS and membrane stiffness/modulus for the explanted leaflets and ovine valve leaflets were also compared using one-way ANOVA. Paired symbols are used to show statistical difference with $P<0.05$.

Figures 2D, 2E, 2F:
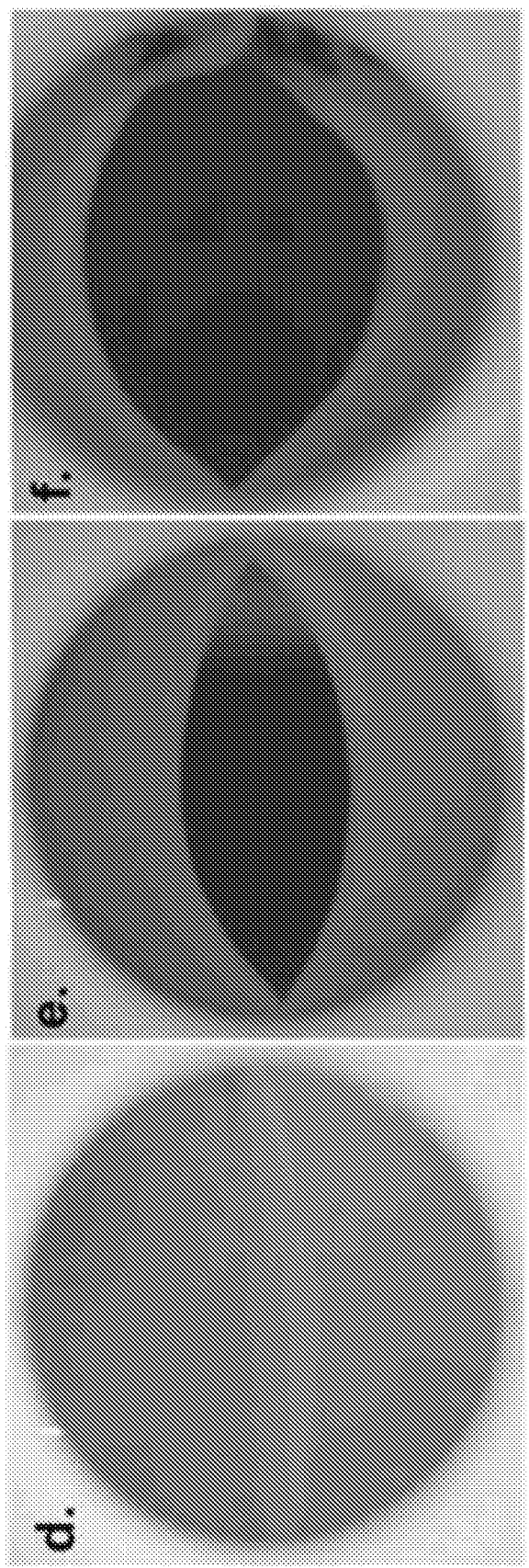
FIG. 2d-2f are photographs of an end-on image of a tissue-engineered valve made as described herein in the closed position (FIG. 2d); and in the open position at 100% leaflet length relative to stent diameter (FIG. 2e) and 125% leaflet length relative to stent diameter (FIG. 2f).

Example 11—Pulse Duplicator Testing of Mock Vein Valve with Engineered Matrix Leaflets In order to inform the geometrical design of the tissue-engineered valve (FIG. 1), 14 mm diameter mock vein valves were made (FIG. 2a) to facilitate evaluation of leaflet design in a pulse duplicator. Decellularized engineered tissue with circumferential alignment was cut into sections and mounted such that the direction of matrix alignment was circumferential in the resulting leaflets to emulate the tissue-engineered valve leaflets. The engineered matrix used for the mock valves was also highly collagenous and aligned as seen with trichrome and picrosirius red staining, similar to FIG. 1e,f. The matrix had a thickness of 0.83±0.05 mm, and in the circumferential direction, the maximum tension was 1980±290 N/m and the membrane stiffness was 2820±410 N/m as compared to 308±175 N/m and 799±537 N/m, respectively, for ovine jugular vein valve leaflets in the circumferential direction. To assess the effect of commissure-to-commissure length on valve function, three valves were made with varying free edge lengths, one being a straight length of 14 mm, the second with 15% excess length and the third with 25% excess length, corresponding to increased coaptation area. Each valve was tested in the pulse duplicator system with an average flow rate of 1.8 LPM and corresponding peak forward flow of 3.5 LPM. The open valve pressure drops (FIG. 2b) and percent regurgitations (FIG. 2c) were measured to assess the effect of leaflet length on those parameters. An end-on camera was used to record leaflet motion, which showed complete closure even for a 14 mm leaflet length (FIG. 2d) and a larger orifice with an increased leaflet length (FIG. 2e&f). Pressure gradients were highest with no excess leaflet length and reduced to less than 1.0 mmHg with 25% excess leaflet length. While some reports show valves with larger orifices require larger closing volumes, no such trend was found for the tissue-engineered valve, with all three leaflet designs showing similar regurgitation fractions.

Example 12—Hydrodynamic Performance of Tissue-Engineered Valves

Figures 3E, 3F:
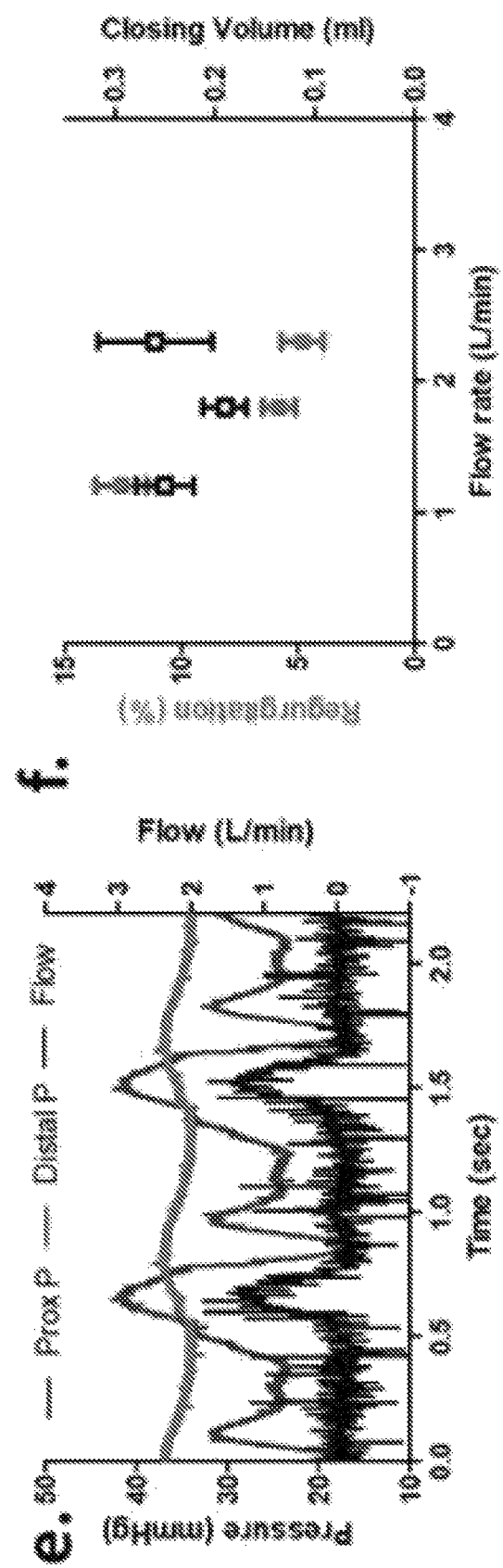
FIG. 3e-3f are graphs showing typical pressure and flow profiles during a cycle for a tissue-engineered valve made as described herein (FIG. 3e) and regurgitation tested at various flow rates (FIG. 3O.
Figure 3G:
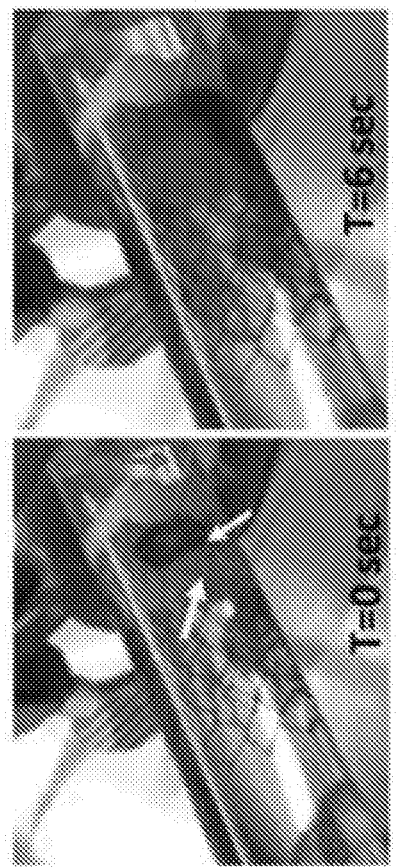
FIG. 3g is a graph showing open-valve pressure drop for a tissue-engineered valve made as described herein and an ovine jugular vein valve (the dotted line was measured flow in sheep jugular vein in standing position under manual restraint using ultrasound).

Based on the mock vein valve testing, it was determined that excess leaflet length (i.e., free edge length exceeding the diameter of the stent) is needed for an acceptable open valve pressure drop. Tissue-engineered valves were therefore designed with leaflet length at 115% of stent diameter to minimize open-valve pressure drop without allowing the leaflets to contact the valve root (i.e., the matrix-embedded stent) wall when fully open. Thus, when implanted, the likelihood of leaflet fusion to the root valve wall (i.e., the stent embedded by matrix) will be reduced during any prolonged open phase of the valve cycle. The resulting tissue-engineered valve is a Nitinol stent covered with decellularized engineered tissue and two leaflets consisting of circumferentially aligned collagen fibers, as seen with trichrome and picrosirius red staining (FIG. 1e&f). Tissue-engineered valves were evaluated in the pulse duplicator at various flow rates to capture a range of flows to which it could be subjected in vivo. During testing, an end-on camera was used to capture leaflet motion (FIG. 3*ad*). It could be seen that the leaflets collapsed to close the valve during the closed phase, whereas the leaflet design prevented the leaflets from touching the root stent wall during the open phase. During testing, pressures upstream and downstream of the valve, along with flow rate, were measured (FIG. 3*e*). Forward flows up to 2.3 LPM were evaluated, and an increasing trend was seen in forward pressure gradient during open phase. However, even at 2.3 LPM, mean pressure drops were only 3.7±0.9 mmHg (FIG. 3*g*). Regurgitation volume was due entirely to the closing volume (i.e., nil leakage after closure), which stayed constant at different flow rates with fraction regurgitation therefore decreasing with increasing flow rate (FIG. 3*f*). For the three valves tested, the outflow resistance, defined as $\Delta P/Q$ during open systolic phase was calculated to be 3.0±0.2 mm Hg·min/L. By way of comparison, a tri-leaflet ovine jugular vein valve was similarly tested (the majority of veins dissected contained no valve or a valve with only one leaflet). End-on images show it possessed a relatively larger orifice (FIG. 3*d*) during open phase compared with the tissue-engineered valve (FIG. 3*b*), which corresponded with lower pressure drops (FIG. 3*g*). The closing volume and regurgitation were not calculated, as the native valve leaked during the entire closed phase due to a central gap between the leaflets (FIG. 3*c*).

Figure 3H:
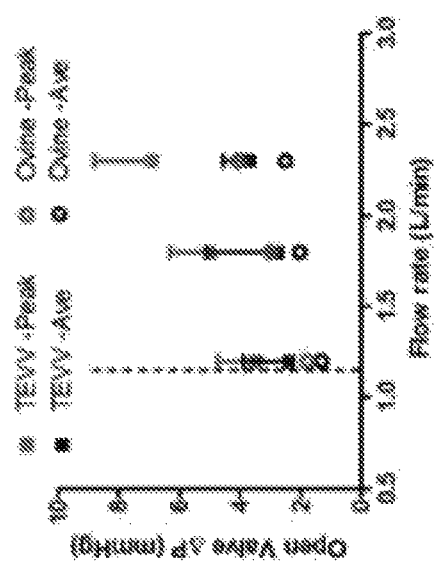
FIG. 3h is an image of a tissue-engineered valve made as described herein in a transparent tube during dye injection test at t=0 sec and at t=6 sec after dye injection during constant flow (white arrows point to leaflets and red arrow points to dye injector).

Washout was assessed via dye injection near the belly of the leaflets just downstream of the valve (FIG. 3*h*) before or during a constant flow rate of 400 mL/min. It was observed that dye rapidly appeared downstream of the valve when injection started during constant flow or was completed before constant flow commenced despite some gravitational settling of the dye near its injection site. The 400 mL/min flow rate of PBS was more than 30× greater than the dye injection rate, indicating the washout visualized during flow was likely not perturbed by the dye injection.

Figure 4A:
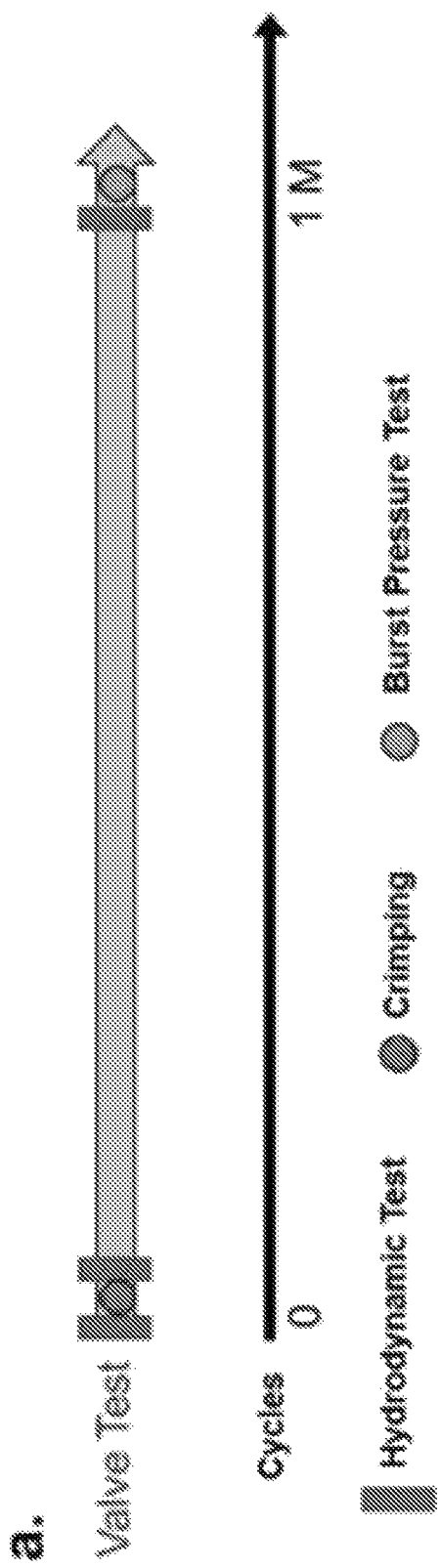
FIG. 4a is a timeline of a tissue-engineered valve (n=3) tested in the pulse duplicator with hydrodynamic properties measured before and after crimping and again after 1 million cycles.
Figures 4B, 4C, 4D:
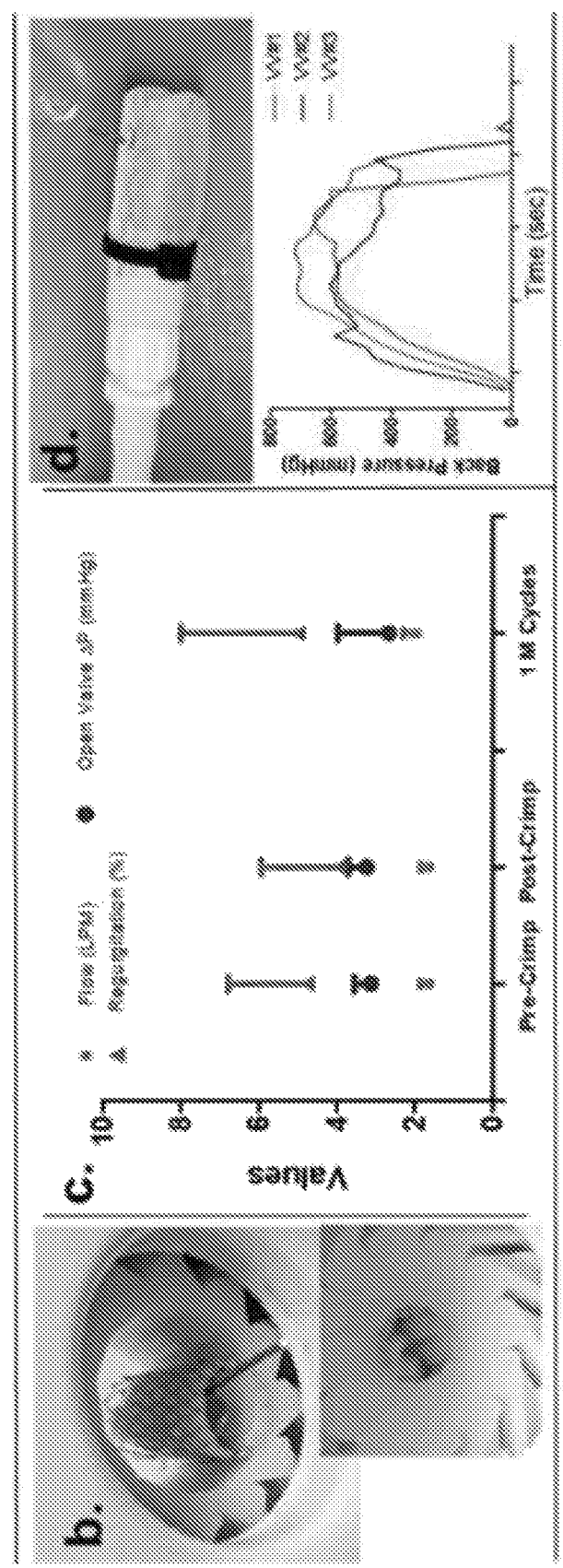
FIG. 4b is an image of a tissue-engineered valve made as described herein in a crimper (top) and when crimped to 50% of initial diameter (bottom).
FIG. 4c is a graph showing the hydrodynamic properties of a tissue-engineered valve made as described herein including systolic pressure (blue) and regurgitation (green), showing no change for a representative flowrate of ~2 LPM.
FIG. 4d is an image of a tissue-engineered valve made as described herein (top) and tested for backpressure after 1 million cycles (bottom), with pressure curves showing failure at >600 mmHg. The red arrow in the top image points to where the valve failed, with tissue peeling from the stent at the suture site.

Example 13—Effects of Crimping and Fatigue Testing on Tissue-Engineered Valve Performance and Matrix Properties The complete timeline of tissue-engineered valve testing is shown in FIG. 4*a*. Valves were crimped to 50% of their original diameter after hydrodynamic testing and maintained in the crimper for 15 minutes to simulate transcatheter delivery (FIG. 4*b*). Post-crimping analysis showed no qualitative damage to the leaflet matrix or matrix peeling from the stent. Hydrodynamic testing at various flows immediately post-crimping showed no difference in open-valve pressure drop or regurgitation fraction (i.e., closing volume) (FIG. 4*c*) or visual change in leaflet motion.

Post-crimped valves were fatigue-tested for 1 million cycles at 100 cpm. After 1 million cycles, valves were evaluated for hydrodynamic performance at various flow rates to evaluate any change in measured parameters. Again, no change was observed in leaflet motion, regurgitation fraction (closing volume), or open-valve pressure drop (FIG. 4*c*). Valves were removed from the pulse duplicator system and pressurized in a custom backpressure system until valve failure. Two valves failed at 602 mmHg and 655 mmHg due to matrix rupture at suture sites to the stent (e.g., red arrow in FIG. 4*d*), indicating the leaflets are capable of withstanding back pressures higher than 600 mmHg. The third valve's leaflets prolapsed following tissue rupture at a commissure, leading to a failure pressure of 721.2 mmHg.

Figures 5A, 5B, 5C, 5D:
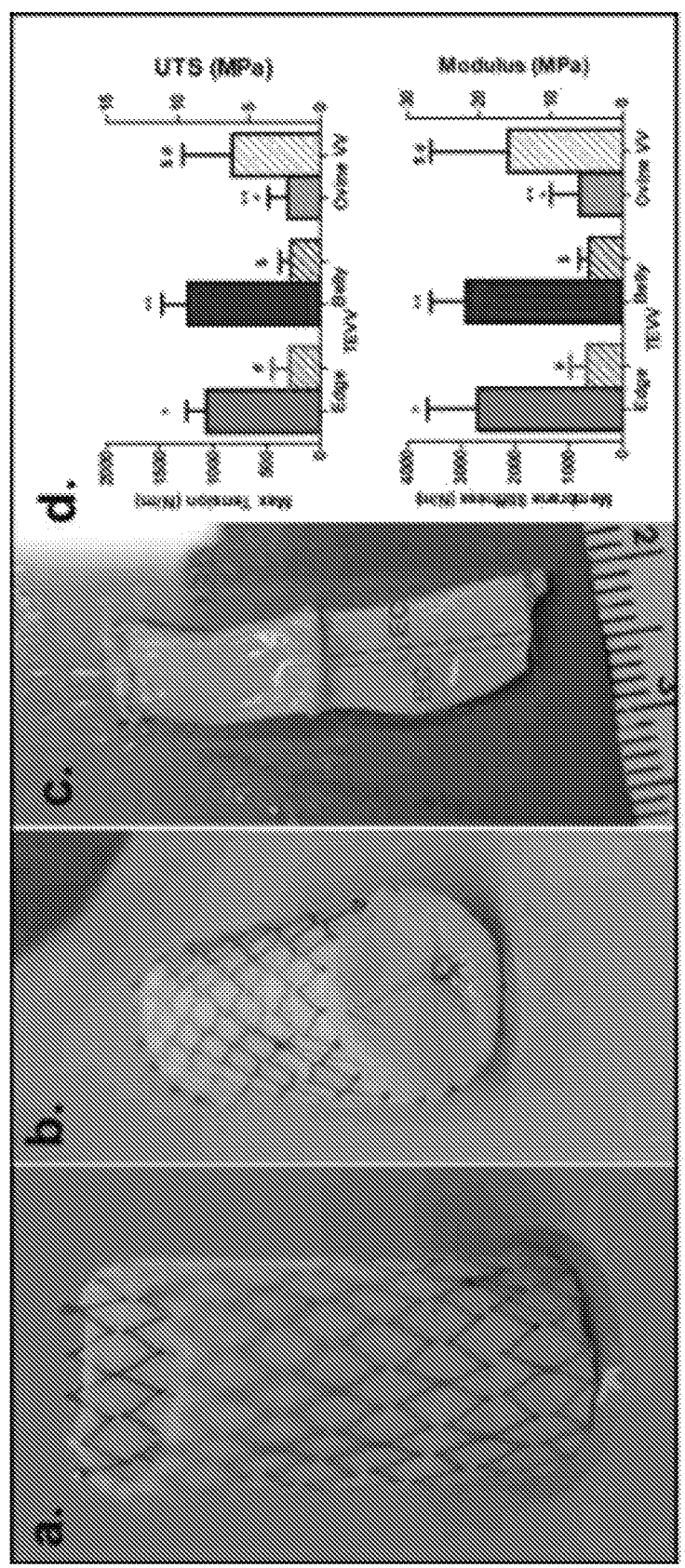
FIG. 5a-5b are images of a tissue-engineered valve made as described herein from the side (FIG. 5a) or showing the leaflets (FIG. 5b) after crimping and 1 million cycles. No damage was evident.
FIG. 5c is an image of leaflets (LF) cut from a tissue-engineered valve made as described herein showing both the free edge region (EC) and belly region (BC).
FIG. 5d are graphs showing the tensile properties (e.g., maximum tension, ultimate tensile strength (UTS), membrane stiffness, and modulus of the matrix leaflet) of the EC and BC from a tissue-engineered valve made as described herein compared to values from an ovine jugular vein valve leaflet (gray) (UTS and modulus are shown with cross-hatched bars (paired symbols show a difference at $P<0.05$)).

After failure testing, matrix covering the stent was qualitatively assessed for other damage and matrix peel, which were absent (FIG. 5*a*&*b*). Leaflets were cut into two circumferential strips, one including the belly region (BC), the other including the free edge (EC) (FIG. 5*c*). Maximum tension and membrane stiffness were measured for the two regions to ascertain if fatigue testing damaged the free edge of the leaflet. No difference was found in either metric (FIG. 5*d*). Ovine jugular vein valve leaflets were also tensile tested, and the fatigue-tested engineered matrix was found to exceed native tissue stiffness values (FIG. 5*d*). Because the native ovine vein valve leaflet is much thinner than the engineered matrix leaflets fabricated in this study (~50 μm vs. ~800 μm), when comparing intrinsic values, both UTS and modulus are ~200% higher for a native leaflet.

The tissue-engineered valve matrix described herein was measured to be stiffer than ovine jugular vein valve leaflets, in terms of membrane stiffness, due to its much greater thickness. This stiffer tissue likely explains the ~50% higher pressure gradients during the open phase and could portend a higher closing volume. For the tissue-engineered valve made as described herein, both of those parameters were measured and pressure drop was found to be <4 mmHg and closing volume was found to be <10%. Therefore, despite the engineered matrix being stiffer than ovine jugular vein valve tissue, there were no adverse effects on valve hydrodynamics, and the combination of thickness and UTS also yielded a high failure backpressure (>650 mmHg). It would be appreciated, however, that the fabrication process of the biologically-engineered hydrogel could be adjusted to yield thinner and/or softer matrix, if necessary.

Example 14—Tissue-Engineered Valve Function and Remodeling in a Sheep Model

Figures 6A, 6B, 6C, 6D:
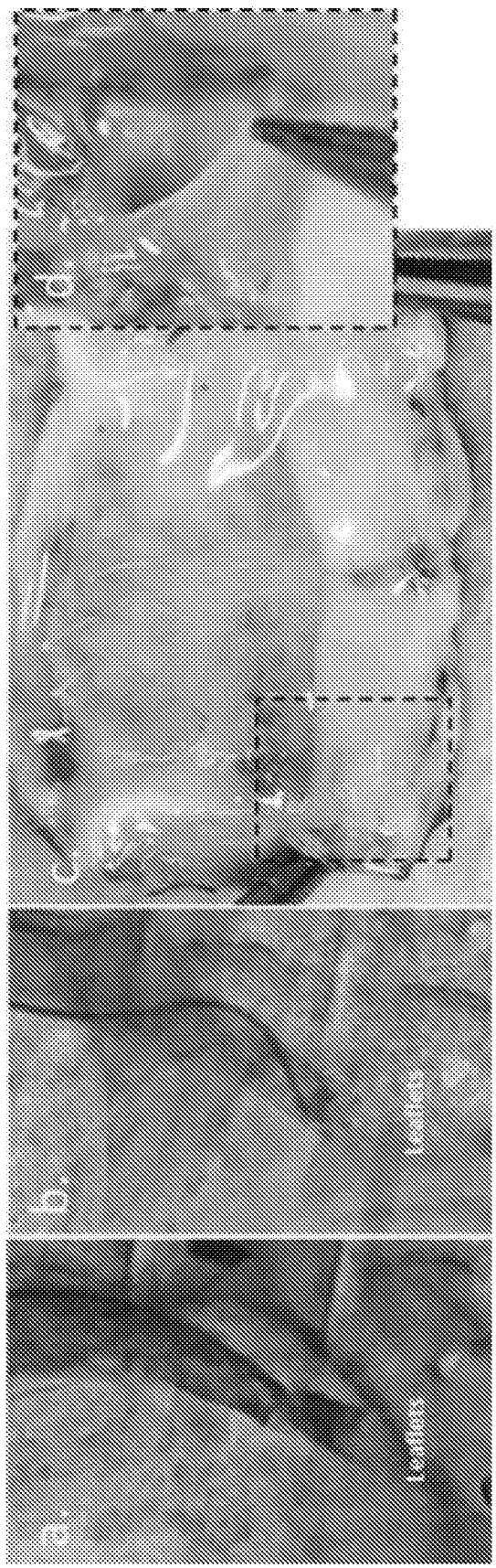
FIG. 6a-6b are images following catheter delivery of a tissue-engineered valve made as described herein into an ovine iliac vein. The images show valve closure immediately after back-flush of contrast dye using angiography (FIG. 6a) and 2 weeks post-delivery (FIG. 6b).
FIG. 6c-6d are images showing the explanted valve after 8 weeks showing leaflets fused to the root (FIG. 6c) and a closer view showing the leaflets fused to the root were not firmly adhered except along the leaflet free edge, which could be pulled from the root (FIG. 6d).
Figures 6E, 6F, 6G, 6H:
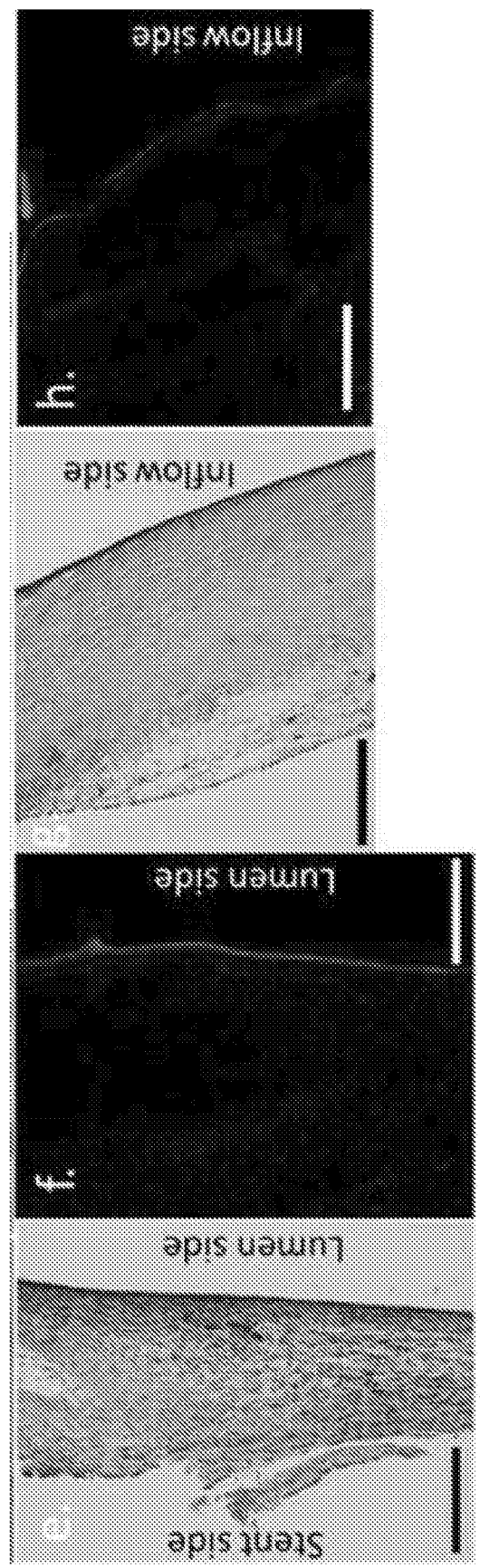
FIG. 6e-6f are images of trichrome staining (FIG. 6e) or immunostaining for vWF (FIG. 6f) of the lumen side, demonstrating extensive recellularization of the root including complete endothelialization of its lumenal surface (500 µm scale bar).
FIG. 6g-6h are images of trichrome staining (FIG. 6g) or immunostaining for vWF (FIG. 6h) of the inflow side, demonstrating extensive endothelialization of the inflow surface of the leaflet, although much less recellularization of the bulk matrix as compared to the root (500 µm scale bar; arrow indicates location of the leaflet free edge).

In Animal #1, the diameter of the tissue-engineered valve was measured using angiography as 8.6 mm post-delivery into the iliac vein. At 8 weeks, the tissue-engineered valve was occluded with a blood clot. Animal #2 had an iliac vein comparable in size to the 12 mm diameter tissue-engineered valve, measured to be 11.9 mm via angiography post-delivery. Back-flush of the tissue-engineered valve with contrast dye showed valve closure due to leaflet coaptation (FIG. 6*a*). Angiography at 2 weeks also showed leaflet coaptation (FIG. 6*b*); however, after 8 weeks, contrast dye flowed through the valve without any coaptation evident. The explanted tissue-engineered valve revealed the leaflets appeared fused to the root (FIG. 6*c*). Gross examination indicated leaflets were only fused strongly along their free edge, and once incised along the free edge, the leaflet belly was easily separated from the root (FIG. 6*d*). The leaflets had a thickness of 0.65±0.15 mm. Trichrome staining revealed the root and leaflets were infiltrated by host cells and immunohistochemistry for vWF revealed an apparent complete endothelium on the lumenal surface of the root and on the inflow surface of the leaflet (FIG. 6*e-h*).

It is to be understood that, while the methods and compositions of matter have been described herein in conjunction with a number of different aspects, the foregoing description of the various aspects is intended to illustrate and not limit the scope of the methods and compositions of matter. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. A method of making an engineered valve, comprising:
    casting or molding a hydrogel into a tubular structure having a first end and a second end, wherein the first end of the tubular structure is cast or molded around a tubular support structure, wherein the second end of the tubular structure is cast or molded in the absence of the support structure;
    everting the hydrogel at the second end through the support structure;
    anchoring the second end of the tubular structure to the support structure at a first position and a second position, wherein the anchored first position and the anchored second position result in commissures, forming leaflets therebetween;
    thereby producing an engineered valve.

2. The method of claim 1, wherein the hydrogel comprises from agarose, methylcellulose, hyaluronan, collagen, fibrin, fibrinogen, or combinations thereof.

3. The method of claim 1, wherein the hydrogel comprises fibrin.

4. The method of claim 1, wherein the hydrogel comprises collagen.

5. The method of claim 1, wherein the hydrogel comprises matrix-producing cells.

6. The method of claim 5, wherein the matrix-producing cells are fibroblasts.

7. The method of claim 5, wherein the method further comprises culturing the tubular structure comprising the support structure under conditions in which the hydrogel comprising the matrix-producing cells is remodeled into a tubular extracellular matrix comprising the support structure at the first end.

8. The method of claim 7, wherein the method further comprises culturing the tubular structure under conditions in which the tubular extracellular matrix comprises circumferentially aligned fibers.

9. The method of claim 1, wherein the support structure is a stent or a wireform.

10. The method of claim 9, wherein the stent is a self-expanding stent or a balloon-expanding stent.

11. The method of claim 1, wherein the second end of the tubular structure is cast or molded using a mandrel, a mold, or combinations thereof.

12. The method of claim 1, wherein the anchoring step comprises stitching, suturing, stapling, gluing, or combinations thereof.

13. The method of claim 1, further comprising anchoring the second end of the tubular structure to the support structure at a third position.

14. The method of claim 1, wherein a commissure-to-commissure length, when flat, is about 100% to 125% of an inner diameter of the tubular structure.

15. The method of claim 1, wherein a commissure-to-commissure length, when flat, is about 110% to 120% of an inner diameter of the tubular structure.

16. The method of claim 1, wherein a commissure-to-commissure length, when flat, is about 115% of an inner diameter of the tubular structure.

17. A method of making a tissue-engineered valve, comprising:
    casting or molding a hydrogel comprising matrix-producing cells into a tubular structure having a first end and a second end, wherein the first end of the tubular structure is cast or molded around a stent, wherein the second end of the tubular structure is cast or molded in the absence of the stent;
    culturing the tubular structure comprising the stent under conditions in which the hydrogel comprising the matrix-producing cells is remodeled into a tubular extracellular matrix comprising the stent at the first end;
    decellularizing the tubular extracellular matrix comprising the stent at the first end;
    everting the second end of the tubular extracellular matrix through the stent; and
    anchoring the second end of the tubular extracellular matrix to the stent at a first position and a second position, wherein the anchored first position and anchored second position result in commissures, forming leaflets therebetween;
    thereby producing a tissue-engineered valve.

18. The method of claim 17, wherein the hydrogel comprises fibrin.

19. The method of claim 17, wherein the matrix-producing cells are fibroblasts.

20. The method of claim 17, wherein the method further comprises culturing the tubular structure under conditions in which the tubular extracellular matrix comprises circumferentially aligned fibers.

21. The method of claim 17, wherein the anchoring step comprises stitching, suturing, stapling, gluing, or combinations thereof.

22. The method of claim 17, wherein a commissure-to-commissure length, when flat, is about 100% to 125% of an inner diameter of the tubular structure.

23. The method of claim 17, wherein a commissure-to-commissure length, when flat, is about 110% to 120% of an inner diameter of the tubular structure.

24. The method of claim 17, wherein a commissure-to-commissure length, when flat, is about 115% of an inner diameter of the tubular structure.

* * * * *

UNITED STATES PATENT AND TRADEMARK OFFICE
CERTIFICATE OF CORRECTION

PATENT NO. : 12,465,486 B2
APPLICATION NO. : 17/614225
DATED : November 11, 2025
INVENTOR(S) : Zeeshan Syedain and Robert Tranquillo It is certified that error appears in the above-identified patent and that said Letters Patent is hereby corrected as shown below:

In the Claims

In Claim 2, delete "from agarose," and insert -- agarose, --

Signed and Sealed this
Sixth Day of January, 2026

John A. Squires
*Director of the United States Patent and Trademark Office*